(12) United States Patent
Davis et al.

(10) Patent No.: US 7,599,469 B2
(45) Date of Patent: Oct. 6, 2009

(54) NON-INTRUSIVE PRESSURE GAGE

(75) Inventors: Clint A. Davis, Bellaire, TX (US);
David H. Theiss, Houston, TX (US);
William M. Taylor, Houston, TX (US);
Gerald S. Baker, Houston, TX (US);
Larry E. McDonald, Hempstead, TX (US)

(73) Assignee: Cameron International Corporation, Houston, TX (US)

( * ) Notice: Subject to any disclaimer, the term of this patent is extended or adjusted under 35 U.S.C. 154(b) by 437 days.

(21) Appl. No.: 11/414,037

(22) Filed: Apr. 28, 2006

(65) Prior Publication Data
US 2007/0251688 A1    Nov. 1, 2007

(51) Int. Cl.
G01N 23/083    (2006.01)
G01V 5/08    (2006.01)

(52) U.S. Cl. .............................. 378/58; 378/59; 378/60; 250/269.1

(58) Field of Classification Search ............. 378/58–60, 378/51; 250/253, 256, 257, 259–262, 264, 250/266, 267, 269.1–269.8
See application file for complete search history.

(56) References Cited

U.S. PATENT DOCUMENTS

| | | | | |
|---|---|---|---|---|
| 2,821,636 A | * | 1/1958 | Jefferson | 250/497.1 |
| 2,919,351 A | * | 12/1959 | Swift, Jr. | 250/308 |
| 2,940,302 A | * | 6/1960 | Scherbatskoy | 73/40.5 A |
| 3,249,760 A | * | 5/1966 | Miller | 250/231.19 |
| 3,291,995 A | * | 12/1966 | Schalkowsky | 250/231.19 |
| 3,301,062 A | * | 1/1967 | Reesby et al. | 73/701 |
| 3,387,133 A | * | 6/1968 | Chope | 250/370.01 |
| 3,802,252 A | | 4/1974 | Hayward et al. | |
| 3,915,009 A | * | 10/1975 | Worden et al. | 73/701 |
| 3,977,391 A | * | 8/1976 | Fleischmann | 600/561 |
| 4,009,616 A | | 3/1977 | Wonn | |
| 4,187,718 A | | 2/1980 | Shibasaki | |
| 4,272,984 A | * | 6/1981 | Bell | 73/40.5 R |
| 4,502,334 A | * | 3/1985 | Gorgens et al. | 73/705 |
| 4,604,898 A | | 8/1986 | Gobin et al. | |
| 4,680,470 A | * | 7/1987 | Heald | 250/358.1 |
| 4,771,177 A | * | 9/1988 | Brown | 250/363.09 |
| 4,872,335 A | | 10/1989 | Tsuruoka et al. | |
| 4,887,672 A | | 12/1989 | Hynes | |
| 5,038,865 A | | 8/1991 | Taylor et al. | |
| 5,170,057 A | * | 12/1992 | Danielson | 250/373 |
| 5,172,112 A | | 12/1992 | Jennings | |
| 5,249,467 A | | 10/1993 | Takashima | |
| 5,343,041 A | * | 8/1994 | Ruscev et al. | 250/269.6 |
| 5,355,631 A | | 10/1994 | Whittington et al. | |
| 5,492,017 A | | 2/1996 | Jennings et al. | |
| 5,544,707 A | | 8/1996 | Hopper et al. | |
| 6,301,973 B1 | | 10/2001 | Smith | |

(Continued)

*Primary Examiner*—Edward J Glick
*Assistant Examiner*—Anastasia Midkiff
(74) *Attorney, Agent, or Firm*—Conley Rose, P.C.

(57) ABSTRACT

In accordance with one exemplary embodiment, the present invention provides a sensor system for detecting a change in condition. The system includes a radioactive source. This system also includes at least one radiation detector configured to detect radiation from the radioactive source. Furthermore, the system includes a displacement assembly configured to physically displace in response to the change in condition and configured to change the radiation levels detected by the radiation detector in response to such displacement. Advantageously, this system facilitates non-intrusive communication of information across a physical barrier, via the measurement of changing radiation levels that change in response to a change in condition, for example.

21 Claims, 10 Drawing Sheets

U.S. PATENT DOCUMENTS

| | | |
|---|---|---|
| 6,408,943 B1 | 6/2002 | Schultz et al. |
| 6,513,596 B2 | 2/2003 | Westar |
| 7,209,545 B2 * | 4/2007 | Radley et al. ............... 378/137 |
| 2003/0042016 A1 | 3/2003 | Vinegar et al. |
| 2004/0020646 A1 * | 2/2004 | Flecker et al. ............ 166/253.1 |

* cited by examiner

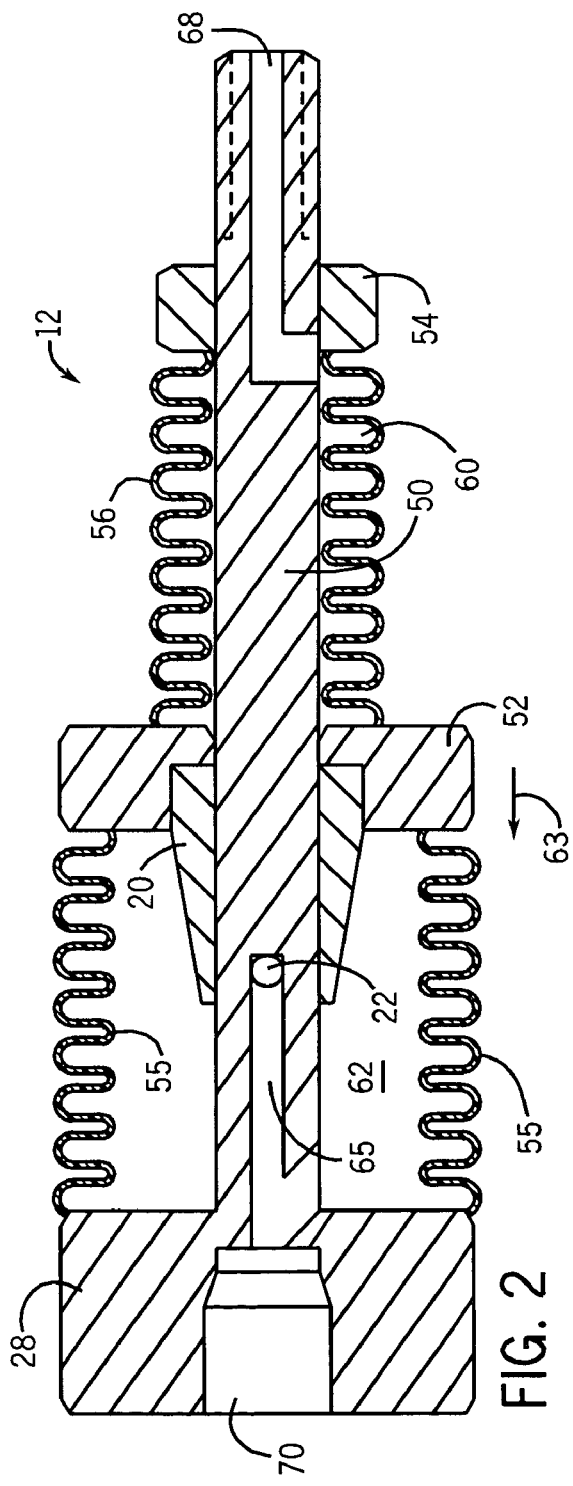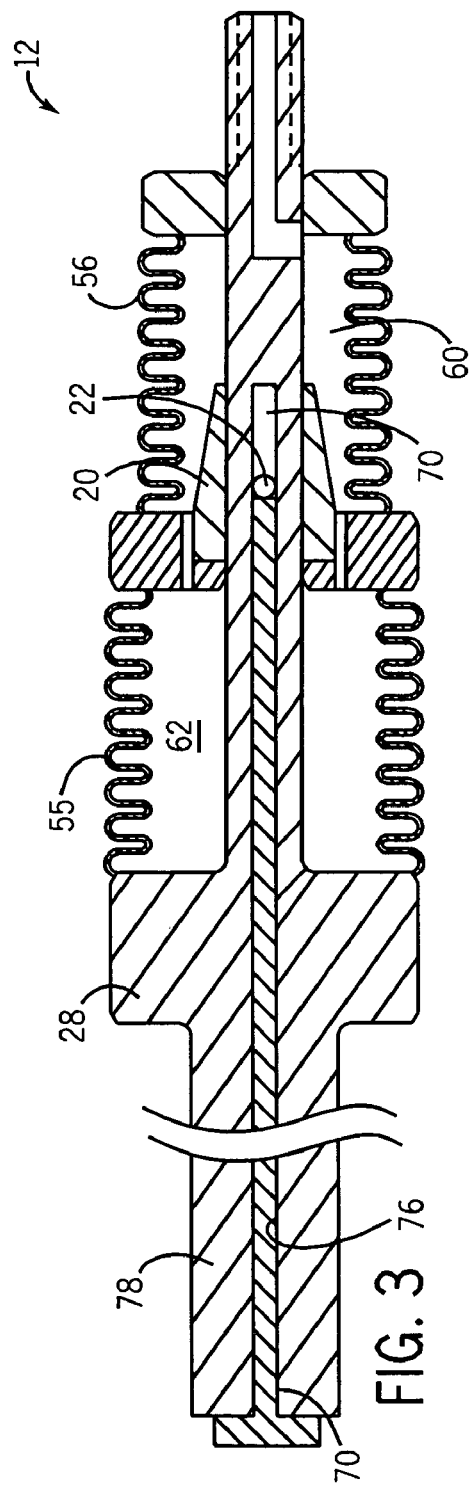

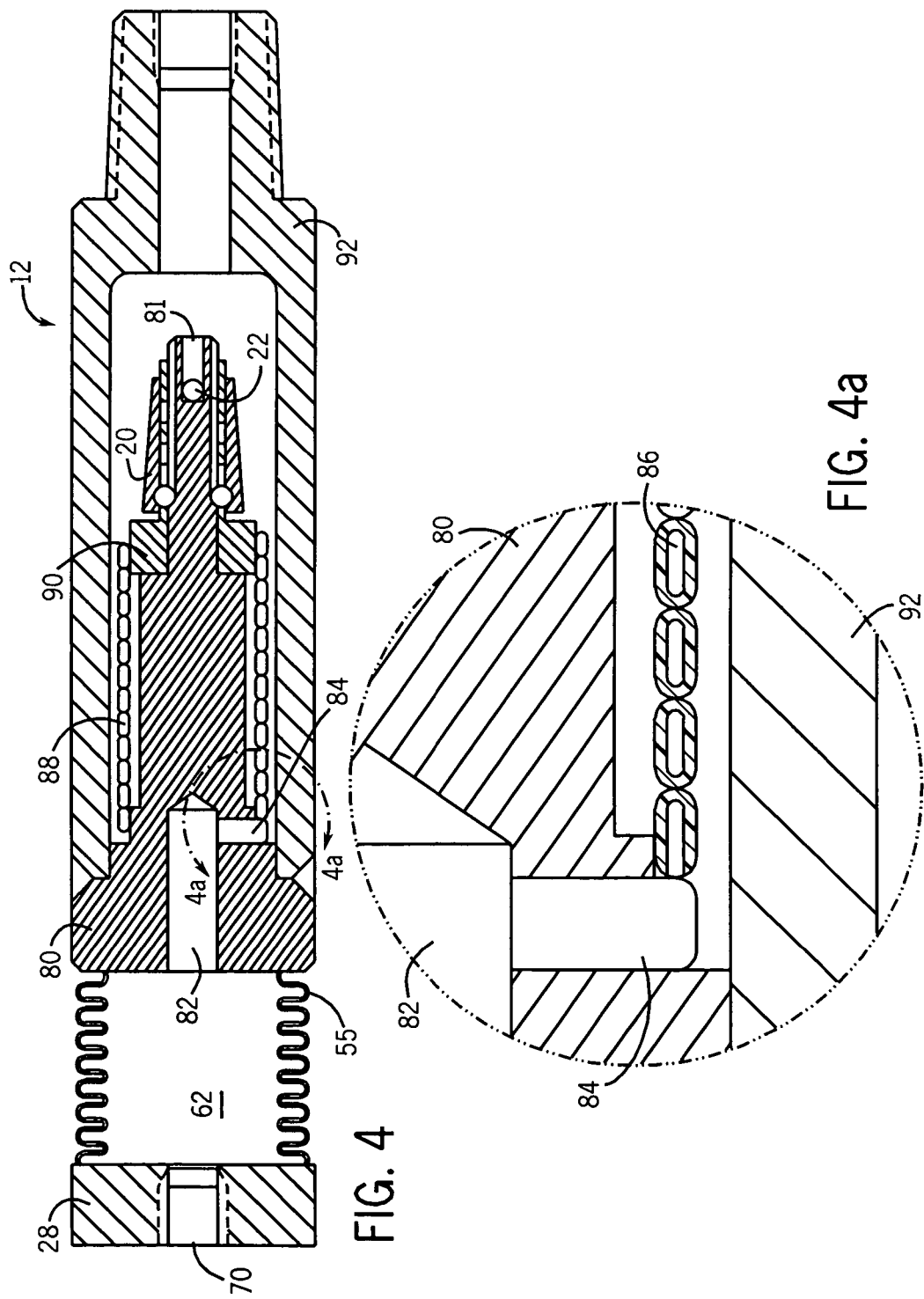

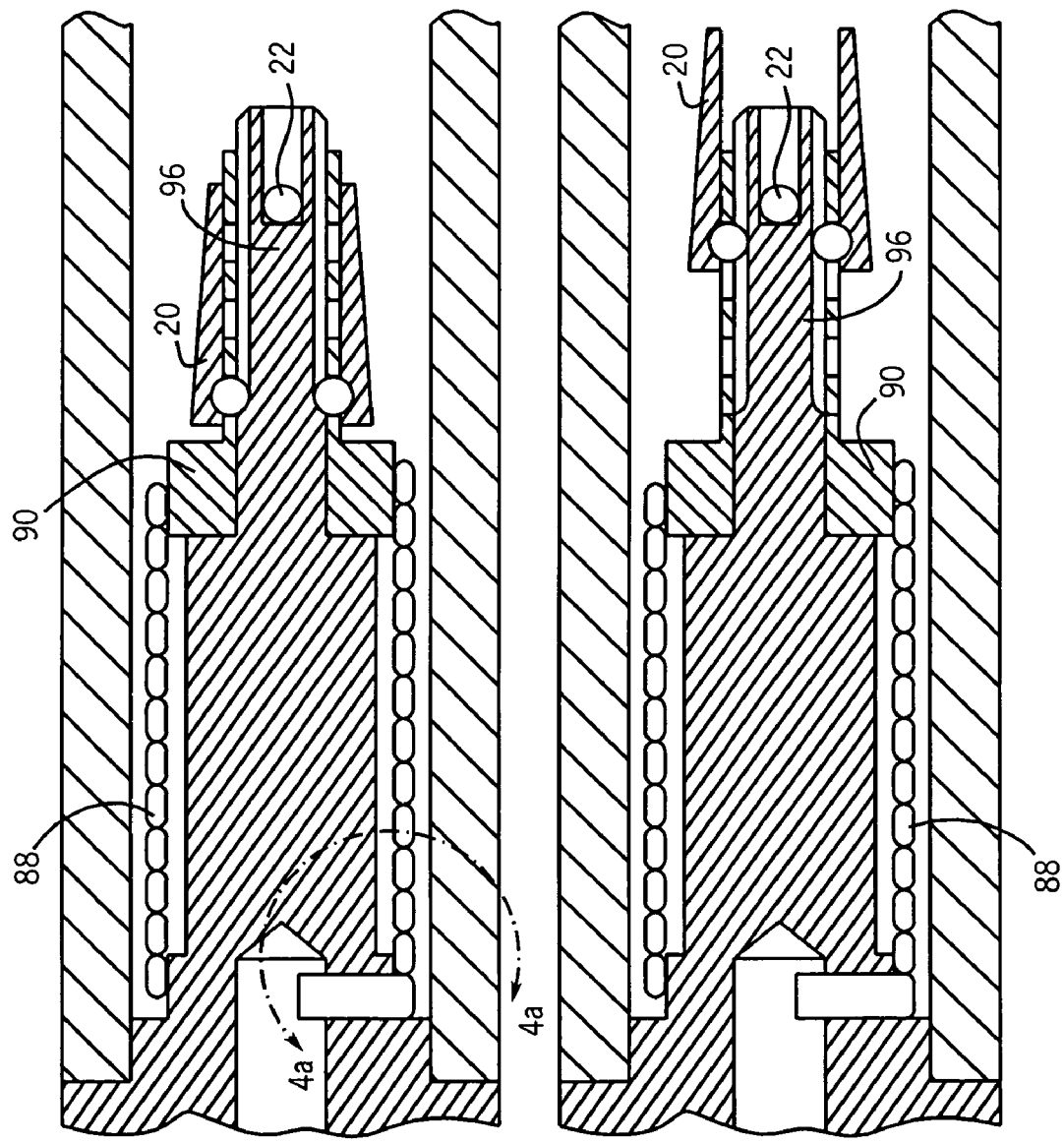

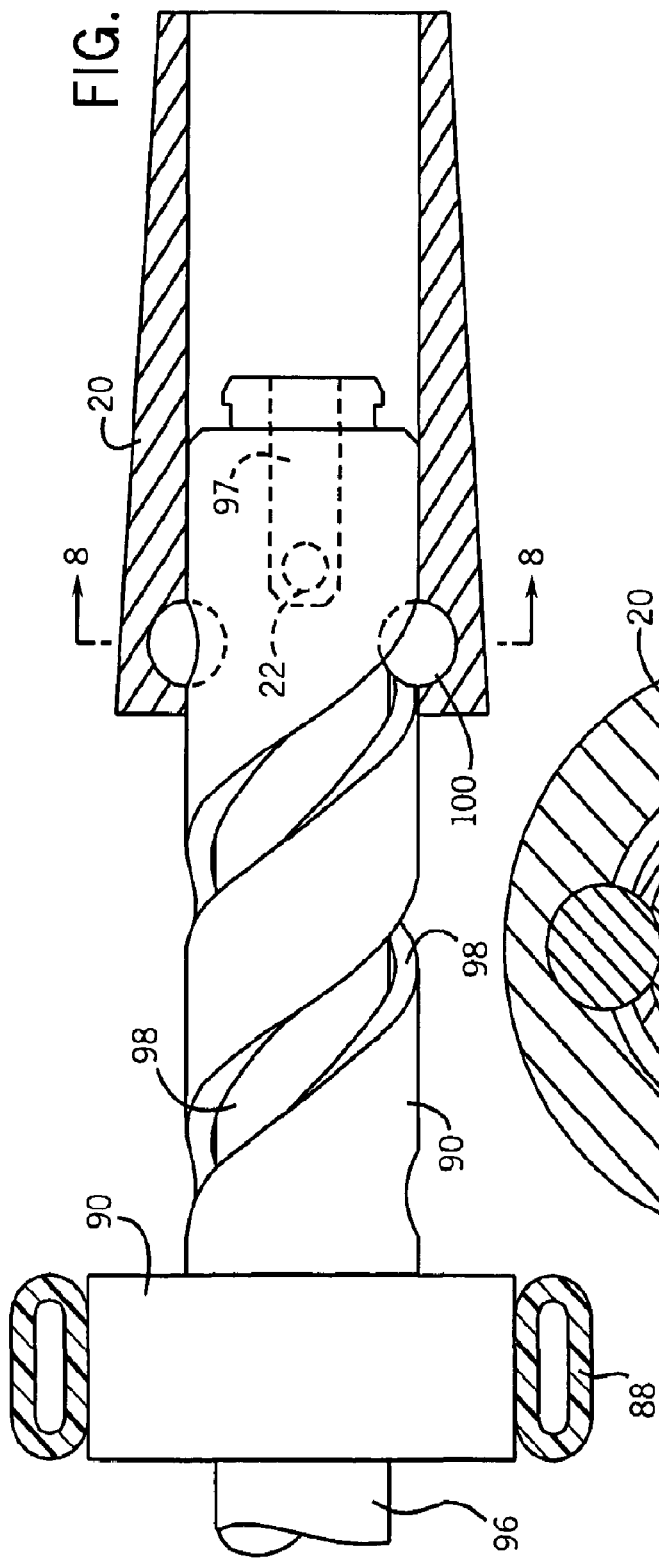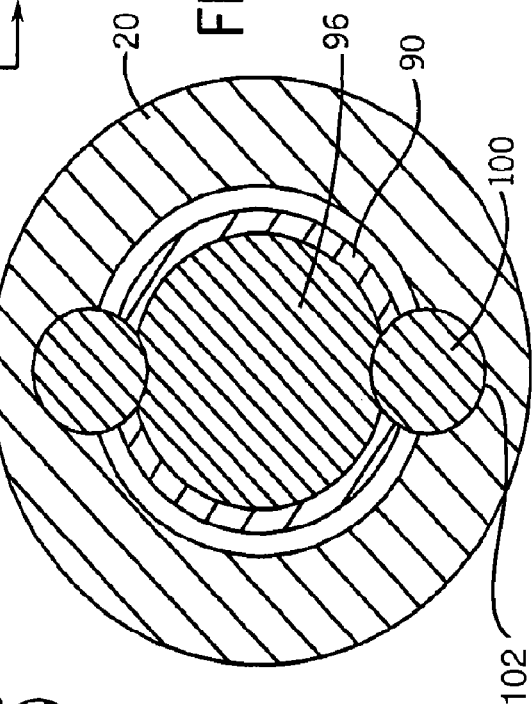

NON-INTRUSIVE PRESSURE GAGE

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND

In accordance with certain embodiments, the present invention relates to methods and apparatus for communicating information through a physical barrier, and, as a specific example, to a non-intrusive annulus pressure monitoring system.

In various situations, it is desirable to transmit information through a physical barrier. For example, in downhole applications, nested tubular members (e.g., casing strings) may extend for thousands of feet below the surface. These casing strings thus cooperate to define annular spaces; and it is often desirable to have information regarding the condition, such as the temperature or pressure, of these annular spaces. As an example, knowledge of a change in condition, such as a change in pressure or temperature, in such an annular space can indicate a loss of sealing integrity between the casing strings or the presence of unfavorable environmental conditions, provoking remedial responses by the operator, for instance.

Unfortunately, traditional annulus monitoring techniques generally require a penetration (i.e., an intrusion) through the wall of one or more of the casing strings to, for example, communicate pressure by means of a hydraulic conduit to pressure monitoring equipment located outside of the annular region or to communicate information obtained by the monitoring equipment disposed in the annular region. For example, conventional techniques often require a port in the casing through which a communication cable from the monitoring equipment in the annular region extends. Similarly, such monitoring equipment may require power from a cable that penetrates the casing string. Penetrations weaken the overall integrity of the given casing string, by providing potential points of leakage and structural weakness.

Therefore, there is a need for improved methods and apparatus for communicating information through a physical barrier. Particularly, there is a need for communicating information through a physical barrier in a non-intrusive manner.

SUMMARY OF THE INVENTION

In accordance with certain embodiments, the present invention provides methods and apparatus for communicating information through a physical barrier. For example, a radioactive source may be placed on one side of the physical barrier, while a radiation detector is placed on the other side. Changes in detected radiation levels can be correlated to changes in condition of the side the source is on, the change being communicated to the detector on the opposite side non-intrusively.

As a particular example, the present invention provides a sensor system for detecting a change in condition of an annular region, for instance. This exemplary system includes a radioactive source as well as at least one radiation detector configured to detect radiation from the source. Additionally, this system includes a displacement assembly that is configured to physically displace in response to the change in condition, such that the radiation levels detected are correspondingly changed as well. For example, the radioactive source can be housed on a carrier that changes the position of the source relative to the detector in response to the change in condition.

Thus, in a downhole application where the source is disposed in an annular region between a pair of casing strings, the displacement mechanism may displace the radioactive source in response to a change in the pressure of the annular region. In turn, this displacement is represented to a set of detectors—which are disposed on an opposite side of the given casing string from the source—as an increase or decrease in radiation levels. Through the use of numerical calculations or look-up tables, for example, the detected radiation level can be correlated with a pressure level, providing a mechanism to quantify the change in pressure in the annular region, for instance. Advantageously, the relatively long half-life of the radioactive source allows for the continuous and non-intrusive communication of information for relatively long periods of time without the need for replacement or an external power source. Moreover, the radioactive source can be of a lesser radioactivity, to accord with various environmental concerns.

Of course, the foregoing are just simply exemplary embodiments of the present invention, and these embodiments, along with other exemplary embodiments, are discussed in further detail below.

DETAILED DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a section view of a non-intrusive monitoring device, in accordance with another exemplary embodiment of the present invention;

FIG. 3 is a section view of a non-intrusive monitoring device, in accordance with another exemplary embodiment of the present invention;

FIG. 4 is a section view of a non-intrusive monitoring device, in accordance with yet another exemplary embodiment of the present invention;

FIG. 4a is a detail view of the device of FIG. 4 taken along arc 4a-4a of FIG. 4;

FIG. 5 is a detail view of the non-intrusive monitoring device of FIG. 4, the device being illustrated in a first operating position;

FIG. 6 is a detail view of the non-intrusive device of FIG. 4, the device being illustrated in a second operating position;

FIG. 7 is an alternate section view of the device of FIG. 4 in the operating position of FIG. 6;

FIG. 8 is a section view of the device of FIG. 7 taken along line 8-8 of FIG. 7;

DETAILED DESCRIPTION

As discussed in detail below, the present invention provides methods and apparatus for communicating information through a physical barrier in a non-intrusive manner. In accordance with one embodiment, the present invention provides a non-intrusive monitoring system for an annular region between downhole casing strings, for instance. By way of example, this monitoring can be effectuated by changing the position of a radioactive source disposed on one side of the casing string relative to detectors disposed on the other side, the change in position being the result of a change in pressure of the annular region, for instance. By extrapolating the differential measurements between the detectors, the change in pressure can be quantified. As another example, the change in detected radiation can be effectuated by positioning a radioactive shield that has varying levels of radioactive absorption at different portions, the shield's changing position in response to the change in pressure resultantly changing the detected radiation levels, for instance.

However, prior to discussing in detail the foregoing and additional exemplary embodiments, it is worth noting that although the following discussion focuses on annulus monitoring in downhole applications, the present invention provides benefits to any number of applications in which the communication of information through a physical barrier in a non-intrusive manner is desired. Such applications include but are not limited to measuring annular spaces in fluid tanks and communicating data beyond a vacuum region, among many other potential applications.

Figure 1:
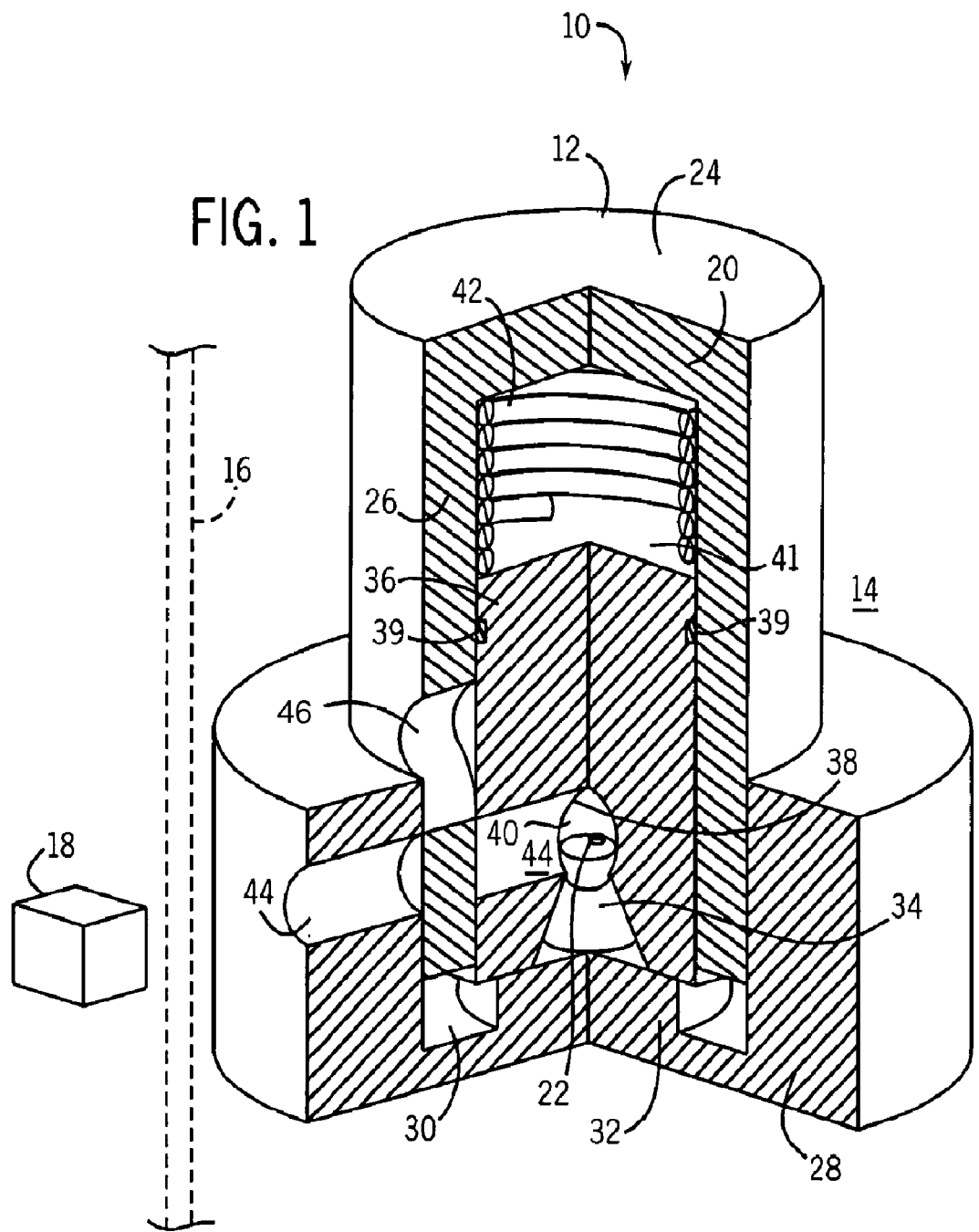
FIG. 1 is a isometric, section view of a non-intrusive monitoring system, in accordance with an exemplary embodiment of the present invention.

Turing to the figures, FIG. 1 illustrates one exemplary embodiment of a non-intrusive monitoring system 10. As illustrated, the system 10 includes a radioactive source device 12 disposed inside an annular region 14 defined by a casing string 16 (illustrated in dash line). The system also includes at least one radiation detector 18, such as a Geiger-Mueller (GM) detector, scintillation crystals, or solid-state semiconductors, disposed on an opposite side of the casing string 16 from the source device 12. (The annular region 14 may be, for example, the "A" or "B" annulus of a downhole casing string system, as will be appreciated by those of ordinary skill in the art in view of the present discussion.) In operation, radioactive particles emitted by the source device 12 pass through the casing string 16. Thus, by altering the amount of radiation emitted by the source device 12 and/or detected by the detector 18, information regarding the annular region 14 can be communicated non-intrusively.

Focusing on the source device 12, it includes a shielding assembly 20 at least partially surrounding a radioactive source 22. The illustrated shielding assembly 20, in this embodiment, is a hollow piston defined by a base portion 24 and a skirt 26 extending from the base portion 24. Thus, the piston surrounds the source 22 on its top and sides. As will be appreciated by those of ordinary skill in the art, forming the shielding assembly 20 of a radioactively absorbent material, such as boron or cadmium or the like, limits the radioactive particles that reach the detector 18. However, the shielding assembly may be formed of any number of suitable materials.

To support the shielding assembly 20, the source device 12 has a base ring 28 that receives the skirt 26 of the shielding assembly 20. Specifically, the base ring 28 includes a recessed region 30 that is sized to receive the skirt 26. Advantageously, close dimensioning between the skirt 26 and the walls of the surrounding recessed region 30 prevents unwanted lateral movement of the shielding assembly 20, restricting it to axial movement only.

The recessed region 30 also partially defines a raised floor 32 of the base ring 28. This raised floor 32 supports the radioactive source 22 on a mount 34, which may be integral with or mounted to the raised floor 32. The source 22, in turn, is secured to the top surface of the mount 34. Moreover, a source retainer 36, which includes a chamber 38 contoured to match the shape of the mount 34, cooperates with the raised floor 32 to surround the mount 34 and secure it in place. The chamber 38 also cooperates with the mount 34 to define a cavity 40 within which the source 22 resides. There is a fluid seal 39 between the inside surface of skirt 26 and the outside surface of source retainer 36. Thus, the top 24, the skirt 26 and the source retainer 36 cooperate to define a cylindrical void 41, which contains a spring 42. This void 36 can be a vacuum or can be filled with a compressible fluid, for example. Advantageously, the inner peripheral surface of the skirt 26 abuts the outer peripheral surface of the source retainer 36, thus preventing lateral movement of the source retainer 36 and, through the interaction between the chamber 38 and the mount 34, preventing lateral movement of the source 22 as well. The source retainer 36 may be formed of a radioactively absorbent material, to prevent emission of undesired levels of radiation.

To provide natural buoyancy to the shielding assembly 20, the source device 12 includes a compression spring 42 that is confined by the inner surface of the skirt 26 and that acts against the top of the source retainer 36 and the base 24 of the shielding assembly 20. This compression spring 42 biases against axial movement of the shielding assembly 20 toward the base ring 28. Advantageously, the compression spring 42 may be secured to the base portion 24 and the top of the source retainer 36, to prevent axial separation of the open-bottom shielding assembly 20 from the remainder of the device 12.

The source device 12 is designed to provide the radioactive particles from the source 22 a pathway of generally egress through aligned bores 44 in the base ring 28 and the source retainer 36 that are in or can be in communication with the cavity 40. The shielding assembly 20 also includes an aperture 46 in the skirt 26 that is configured to align with these bores 44; however, when the shielding assembly 20 is in its neutral state, due to the spring 42, the aperture 46 fails to align with the bores 44, thus substantially preventing the egress of radioactive particles from the cavity 40, into the bore 44 of the base ring 28, and, ultimately, into the annular region 14.

If, however, there is an increase of pressure in the annular region 14, then the volume of compressible fluid in the cylindrical void 41 that houses the spring 42 begins to compress, better aligning the aperture 46 with the bores 44 and facilitating the egress of radioactive particles from the cavity 40 to the annular region 14. For example, an increase of pressure within the annular region 14 exerts an axially compressive force on the volume of compressible fluid in the cylindrical void 39 that houses the spring 42 in the shielding assembly 20, overcoming the biasing force of the spring 42 and driving the shielding assembly 20 toward the base ring 28. In turn, as the aperture 46 begins to align with the bores 44, it provides an enlarging pathway that places the annular region 14 in fluid communication with the cavity 40. As illustrated, the greater the ambient pressure in the annular region 14, the greater the displacement of the shielding assembly 20, and, in turn, the greater the alignment of the bores 44 with the aperture 46. As a result, the progressing alignment of the aperture 46 with the bores 44 places more and more of the cross-sectional area of the bores 44 in fluid communication with the cavity 40, with full alignment between the bores 44 and the aperture 46 occurring at maximum compression of the spring 42.

As a practical matter, increasing the cross-sectional area of the aperture 46 in alignment with that of the bores 44 increases the quantity of radioactive particles effusing into the annular region 14, progressing through the casing string 16, and detected by the detector 18. In fact, there is a proportional relationship between this cross-sectional alignment of the bores 44 and the aperture 46 and the amount of radioactivity detected by the radiation detector 18. Moreover, there is a proportional relationship between the displacement of the shielding assembly 20 and the change in pressure of the annular region 14. Thus, the amount of radiation detected by the detector 18 is also proportional to the increase of pressure in the annular region 14. Simply put, the source device non-intrusively communicates information regarding a change in condition (i.e., a change in pressure) of the annular region 14 to the detector 18 outside the annular region 14 in a non-intrusive manner. Ultimately, this change in radiation levels detected by the detector 18 can be communicated to one or more processing devices, as discussed further below in relation to FIGS. 10 and 11, to calculate and quantify the change in condition of the annular environment 14.

Advantageously, to limit the amount of radiation released to the environment, it may be desirable to use a low-strength radiation source, such as a 10 µCurrie $Cs_{137}$ source. However, even with such a low-strength radiation source, the half-life is such that the source 22 retains its radioactivity for a relatively long and continuous period of time, without the need for replenishing or replacement. Indeed, $Cesium_{137}$ has a half-life of over 30 years. Moreover, to increase the efficacy of transmission of such a low-emission radiation source 22, it can be beneficial to place the source device 12 and the detector 18 close to the inner and outer walls, respectively, of the casing string 16, thus minimizing the distance therebetween. It is also envisaged that stronger radioactive sources, such as Californium, a neutron source, could be employed.

Prior to progressing, it is again worth noting that the present invention provides benefits not only to downhole applications but to any number of situations in which it is desired to communicate information through a physical barrier in a non-intrusive manner. Moreover, the present device can be configured to detect changes in condition other than pressure. For example, the spring 42 can be replaced with a thermally reactive (e.g., good thermal expansion) material that defines the position of the shielding assembly 20. Furthermore, the change in condition may be a change indicated by an electronic input signal or a mechanical switch. Thus, the change in condition may be a physical change in condition of an environment or a triggering event that is man-made, for example. It is envisaged that the change of condition described and claimed herein encompasses a wide variety of situations in a wide variety of applications.

FIG. 2 illustrates an alternate, exemplary embodiment of the present invention. Specifically, FIG. 2 illustrates an alternative embodiment of the source device 12. This source device 12 includes a base 28 from which extends a stem core 50. The stem core 50 extends through and supports a surrounding moveable bulkhead 52. The stem core 50 restricts movement of the bulkhead 52 to an axial direction generally parallel with the longitudinal axis of the stem core 50. The stem core 50 also supports an upper bulkhead 54; however, this upper bulkhead 54 is fixed in place with respect to the stem core 50.

The exemplary source device 12 also includes flexible bellows 55 and 56, the upper bellows 56 extending from the upper bulkhead 54 to the moveable bulkhead 52 and the lower bellow 55 extending from the moveable bulkhead 52 to the base ring 28. Each of these bellows 55 and 56 surrounds the stem core 50 and, in cooperation with the appropriate bulkhead or base, defines a volume. In this embodiment, the upper bellows 56 define a smaller volume 60 than the larger volume 62 of the lower bellows 55. Of course, this arrangement could be reversed in other embodiments.

In this source device 12, the bellows 55 and 56 maintain a compressible fluid within the volumes 60 and 62, respectively. The compressible fluid is introduced through inlets 68 and 70, which are in fluid communication with volumes 60 and 62, respectively. After the fluid is introduced, the volumes 60 and 62 are isolated from the external environment by sealing inlets 68 and 70.

When placed into an annular region 14 of a casing string 16 assembly (see FIG. 1), the movable bulkhead 52 reacts to changes in the condition of this environment. For example, an increase in the pressure of the annular region 14 causes the moveable bulkhead 52, when taken with respect to the orientation of FIG. 2, to move to the left, as represented by directional arrow 63. As would be appreciated by those of ordinary skill in the art, increased pressure in the annular region 14 acts against the bellows and causes the fluid within volumes 60 and 62 to gravitate toward an equilibrium condition with the external pressure. Because these volumes 60 and 62 are isolated from the annular region 14 and because the fluid within the volumes 62 and 60 is compressible, the lower bellows 55 collapse to reduce the lower volume 62 and, in turn, increase the pressure of the fluid therein. Although this displacement to the left (arrow 63) does increase the volume 60 maintained by the upper bellows 56, the larger diameter (and corresponding volume) of the lower bellows 55 dominates the equilibrium process, as would be appreciated by those of ordinary skill in the art.

The source device 12 takes advantage of the pressure-reactive displacement of the moveable bulkhead 52 to non-intrusively communicate the change in pressure. As illustrated, the moveable bulkhead 52 carries a shielding assembly 20 that surrounds that stem core 50 and that has a tapered profile. As discussed in detail below, the tapered shielding assembly 20 interacts with a radioactive source 22 disposed in a cavity 65 within the stem core 50 to alter the level of radiation detected by the detector 18. By monitoring changes in radiation levels, the source device 12 communicates information indicative of the position of the shielding assembly 20 with respect to the radioactive source 22. And this information, which is collected by the radiation detector 18 disposed outside the annular region, is translated into quantifiable information regarding the annular region 14.

For example, as the moveable bulkhead 52 progress toward the left, the tapered profile of the shielding assembly 20 increases the thickness of radiation absorbing material in a path between the source 22 and the detector 18. As will be appreciated by those of ordinary skill in the art in view of the present discussion, the radioactively absorbent material that comprises the shielding assembly 20 generally does not prevent the passage of all radioactive particles. Rather, the number of radioactive particles that pass beyond the shielding assembly 20 is proportional to the thickness of the shielding assembly surrounding the source 22 at a given distance in a path between the source 22 and the detector 18. The thicker the shielding assembly 20 is with respect to this path, the fewer the radioactive particles that pass through, and, in turn, the lesser the radiation levels detected by the detector 18. Thus, the detected radiation levels are proportionally related to the displacement of the shielding assembly 20, and this displacement, in turn, is proportionally related to the change of condition within the annular region 14, i.e., the change in pressure of the annular region 14. Accordingly, in the embodiment of FIG. 2, an increase in pressure in the annular region 14 causes a decrease in the radiation levels detected by the detector 18, because of the tapered profile of the shielding assembly 20.

FIG. 3 illustrates another exemplary embodiment of a source device 12; but in this device 12 the orientation of the shielding assembly 20 is reversed, thus increasing the radiation levels detected by the detector 18 in response to increased pressure in the annular region 14. The source device 12 of FIG. 3 also includes a placement pin 76 that facilitates insertion and setting of the radioactive source 22. The source device 12 of FIG. 3 has an extended portion 78 that extends from the base 28. Similar to the device 12 of FIG. 2, the extended portion includes inlet 70 that is in fluid communication with the interior region 62 of lower bellows 55. However, unlike the inlet of the FIG. 2 device, the inlet 70 of the FIG. 3 source device extends well into the stem core 50. This extended inlet 70 is thus configured to receive the placement pin 76, which supports the radioactive source 22 at one end. Advantageously, the placement pin 76 facilitates variable axial placement and mounting of the source 22 with respect to the shielding assembly 20 and the source device 12 as a whole. Indeed, the inlet 70 may include threads that engage with corresponding threads on the placement pin 76, to secure and for adjustment of the placement pin 76.

FIG. 4 illustrates yet another exemplary embodiment of a source device 12 in accordance with the present invention. As discussed in detail below, this source device 12 translates rotational motion into linear displacement of the shielding assembly 20 with respect to the source 22. Specifically, the inlet 70 in the base 28 feeds into the lower bellows 55 that define the lower interior region 62. In this embodiment, the lower interior region 62 is filled with an incompressible fluid through inlet 70, which is subsequently plugged to isolate the lower interior region 62 from the annular region 14.

The lower bellows 55 are secured to the base ring 28 and to a central portion 80 of the source device 12. Similar to the stem core 50, the central portion 80 includes a cavity 81 within which the radioactive source 22 resides. This central portion 80 also includes a channel 82 that is in fluid communication with the lower interior region 62 of the lower bellows 55. Through an inlet 84 in the central portion 80, this channel 82 is in fluid communication with the hollow interior 86 of a helical Bourdon tube 88 (see FIG. 4a). The Bourdon tube 88, which surrounds the central portion 80, is secured in place at one end to the central portion 80. At the other end, the Bourdon tube 88 is secured to a camming assembly 90, which, as discussed further below, is free to rotate about the central portion 80 and effectuates axial displacement of the shielding assembly 20. Advantageously, the source device 12 may include a housing 92 that secures to the central portion 80 and that surrounds various components of the source device 12, to protect such components from the environment of the annular region 14.

Focusing on FIGS. 5 and 6, these figures illustrate the mechanism for linear displacement of the shielding assembly 20. When the pressure of the annular region 14 increases, a compressive force is exerted on the flexible lower bellows 55 (see FIG. 4). In turn, the incompressible fluid therein energizes the Bourbon tube 88, causing rotation of the camming assembly 90 and advancing the shielding assembly 20 from the position of FIG. 5 to the position of FIG. 6.

Including FIGS. 7 and 8 in the discussion, it can be seen that the camming assembly 90 surrounds an extended arm 96 of central portion 80 and is free to rotate about this arm 96. (As illustrated in dash line, the arm 96 includes a cavity 97 within which the source 22 resides.) To translate rotation of the Bourdon tube 88 into linear displacement of the shielding assembly 20, the camming assembly 90 includes a helical channel 98 that cooperates with captured ball bearings 100 to effectuate the desired linear motion. Specifically, the ball bearings 100 are confined by the helical channel 98, the extended arm 96, and arcuate notches 102 on the internal peripheral surface of the shielding assembly 20. This confinement is best illustrated in FIG. 8.

During operation, as discussed above, an increase of pressure in the annular region 14 (see FIG. 4) energizes the Bourdon tube 88 and rotates camming assembly 90. However, because ball bearings 100 are captured, they follow the linear progression of the helical channel 98. Concurrently, because ball bearings 100 are also captured by the arcuate notches 102, this advancement linearly advances the shielding assembly 20 as well.

The exemplary shielding assembly 20 has a tapered profile, thus altering the thickness of radiation absorbing material in a pathway from the source 22 to the detector 18 (see FIG. 4). Thus, when in the non-energized position of FIG. 5, a thinner part of the shielding assembly 20 is in the path between the source 22 and the detector 18 (see FIG. 4). Conversely, when in the advanced, energized position of FIG. 6, a thicker part of the shielding assembly 20 rests in the path between the source 22 and the detector 18. As discussed above, the thickness of the radioactively absorbent material in such pathway is proportional to the radiation levels detected by the detector 18. Again, the greater the thickness of the material in the path between the detector 18 and the source 22, the lesser the radiation levels detected. Accordingly, the position of the shielding assembly 20—this position being at least partially defined by the condition (e.g., pressure) in the annular region—determines the level of radiation detected at detector 18. Any changes in the detected radiation level can be extrapolated to determine and quantify the change in the condition of the annular environment.

It is worth noting that, of course, the direction of the taper in the shielding assembly 20 can be reversed, such that an increase of pressure correlates to an increase in the detected radiation levels. Moreover, the taper in the shielding assembly 20 need not be continuous, as is illustrated. The present invention is just as effective when the shielding assembly 20 presents a construction by which a first portion of the shielding assembly facilitates a greater transmission of radiation from the radioactive source at a given distance from the source than a second portion of the shield assembly at the given distance. And the changes in transmission of radiation particles can be produced by altering thicknesses between the first and second portions, by altering the material of composition between the first and second portions, by providing apertures of varying size or shape between the first and second portions, as well as many other construction techniques that will be appreciated by those of ordinary skill in the art in view of the present discussion.

Furthermore, it is worth noting that the above-described source device 20 can be configured to react in response to any number of changes in condition—not just changes in pressure. For instance, rotation of the camming assembly 90 can be controlled by a thermally reactive coil (e.g., a bimetallic strip), thus displacing the shielding assembly 20 in response to a change in temperature of the annular region 14. Further still, the position of the shielding assembly can be electrically controlled by a motor that responds to commands from a controller that receives a change in condition as an electronic input signal. The change in condition also can be a mechanical movement, whether automatically or manually trigger.

Figure 9:
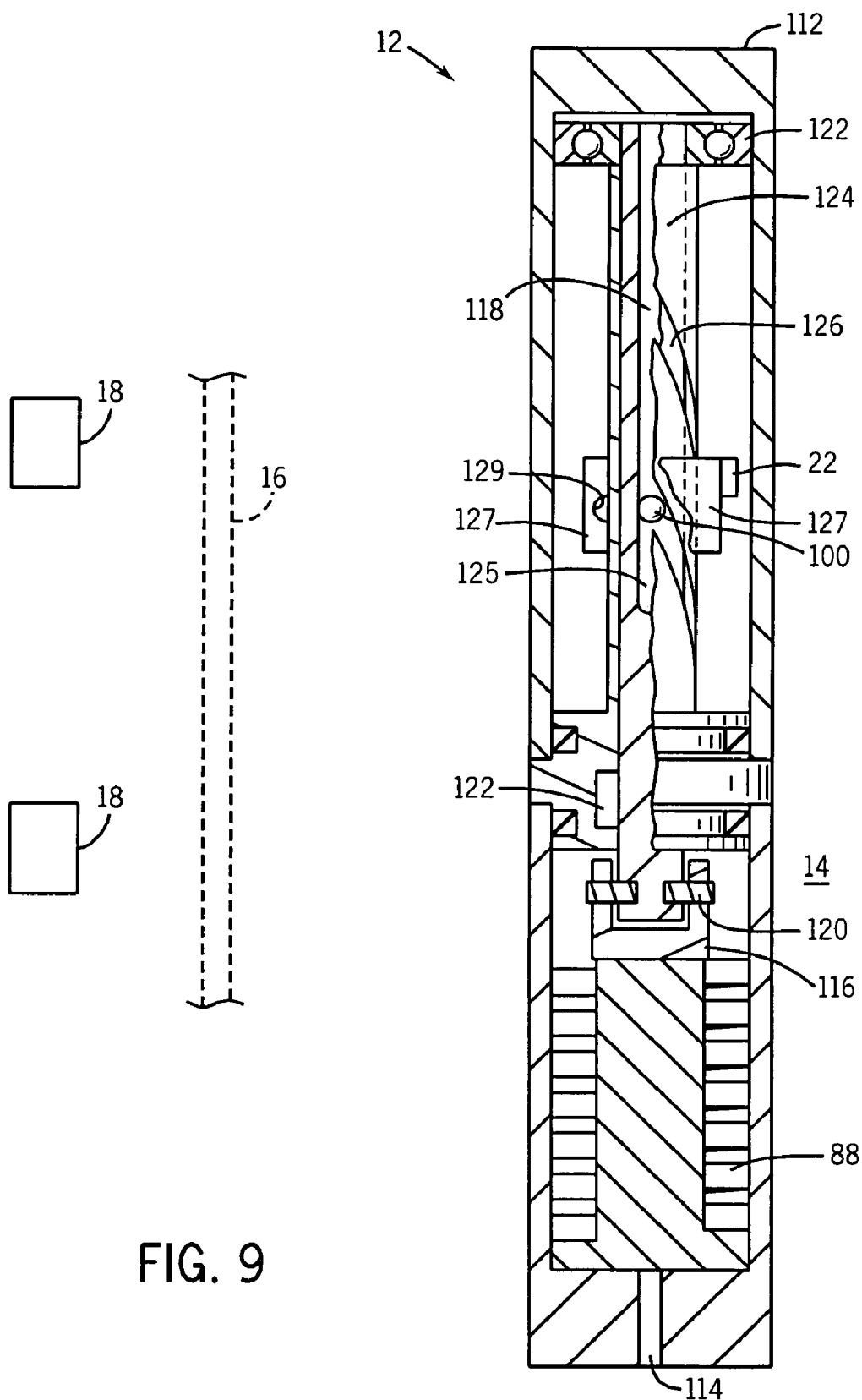
FIG. 9 is a section view of a non-intrusive monitoring device, in accordance with yet another exemplary embodiment of the present invention.

Turning now to FIG. 9, this figure illustrates an alternate, exemplary embodiment of the present invention in which a shielding assembly 20 is not employed. Rather, as is discussed in detail below in relation to FIG. 11, this system employs a positionable source 22 and a plurality of detectors 18, whereby displacement of source 22, as well as the underlying change in condition, is determined through differential comparison of the radiation levels detected by the plurality of detectors 18.

In the source device 12 of FIG. 9, the internal components are generally isolated from the environment of the annular region 14 by the housing 112. However, in the base of the housing 112, an inlet 114 that extends through housing and that is in fluid communication with a Bourdon tube 88 is provided. Thus, in this source device 12, the Bourdon tube 88 is exposed to the annular region 14 and, resultantly, energizes directly in response to a change in pressure of the annular region 14, for example. When energized, the Bourdon tube 88 effectuates rotation of a carriage 116 that is mechanically coupled to a shaft 118 via a pin assembly 120, for example. The shaft 118 is supported by roller bearings 122 that facilitate rotation of the shaft 118. Thus, rotation of the Bourdon tube 88 results in rotation of the shaft 118. The carriage 116 may include appropriate gears that amplify the rotation of the tube 88 to the shaft 118.

The upper portion of the shaft 118 is surrounded by a stationary tube 124 that is supported by the housing 112. This tube 124 includes a helical channel 126 that, in cooperation with captured ball bearings 100, effectuate axial displacement of a carrier assembly 127. Specifically, captured ball bearings 100 reside within axial recesses 125 in the shaft, and are confined by cooperation between an arcuate notch 129 in the carrier assembly 127 and the helical channel 126. Upon rotation of the shaft 118, the ball bearing rotates with the axial recess 125 and, in turn, reacts with the helical channel 126 to move the ball bearings 100 axially. However, because the ball bearings are captured with respect to the carrier assembly 127, this axial displacement of the ball bearings 100 also causes an axial displacement of the carrier assembly 127.

The carrier assembly 127 maintains the radioactive source 22. Thus, displacement of carrier assembly 127 results in a displacement of the source 22 as well. By employing a plurality of detectors at various locations, and by detecting and comparing the change in radiation levels detected by these sensors, displacement of the source 22 indicates a change in the condition of the annular region, e.g., a change in the pressure of the annular region. This differential comparison is further discussed in relation to FIG. 11.

Figure 10:
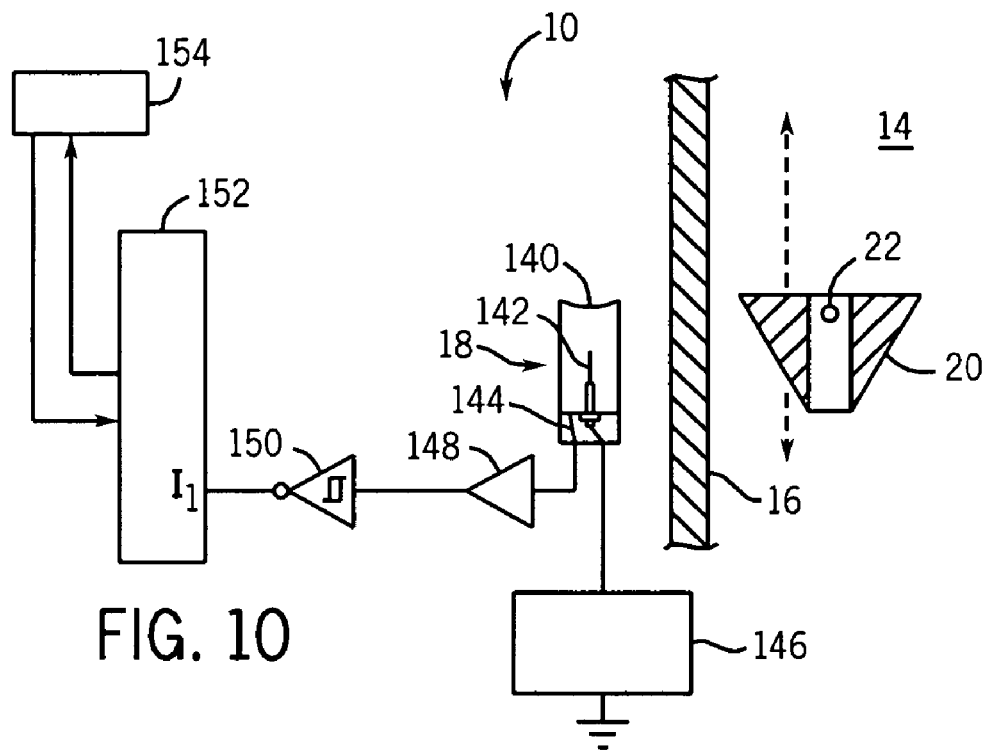
FIG. 10 is a schematic representation of a non-intrusive monitoring system, in accordance with an exemplary embodiment of the present invention.

FIG. 10 illustrates in schematic form an exemplary system that has a source device 12 that effectuates changes in the detected radiation levels through the shielding assembly, like the source devices of FIGS. 1-8. These devices 12 facilitate detection of the change in pressure through the use of a single detector 18, although a plurality of detectors may be employed. The detector of FIG. 10 is a GM detector that has a measurement window 140 and anode and cathode components, 142 and 144, respectively. The anode 142 receives its operating power for the detector 18 from a high-voltage power source 146; and the cathode 144 is coupled to an operational amplifier 148 that is, in turn, electrically coupled to a Schmitt trigger 150. A processing device 152, such as a microprocessor, a logic circuit, or a state device, among other devices, receives input from the Schmitt trigger 150. The processing device 152 is in communication with a controller 154, which may include user input and output devices and may be located downhole or at the surface.

As discussed above, displacement of the shielding assembly due to a change in condition of the annular region 14 changes the radiation levels detected by the GM detector 140. With respect to the orientation of FIG. 10, a downward movement of the shielding assembly decreases the detected radiation levels, while upward movement increases the levels, the source 22 remaining stationary. Advantageously, the processing device 152 and/or the controller 154 may include memory components that quantify the change in condition of the annular region 14 via stored correlative data or formulaic relationships, for instance.

Figure 11:
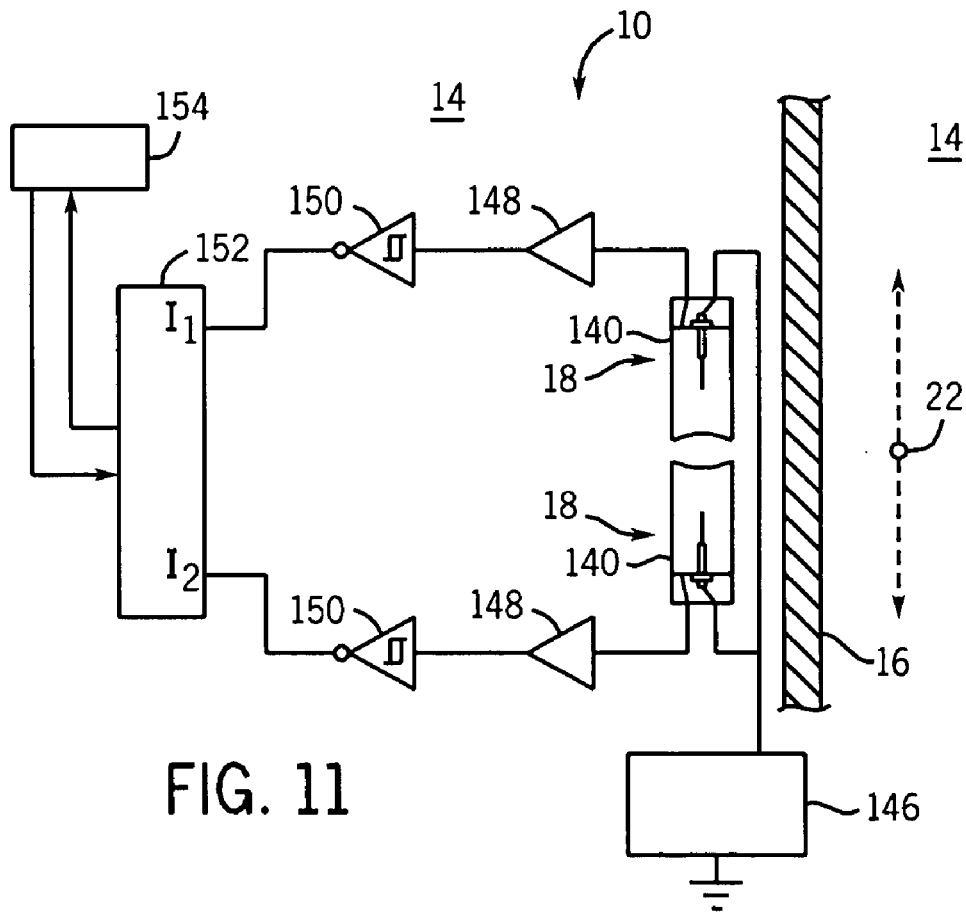
FIG. 11 is a schematic representation of a non-intrusive monitoring system, in accordance with an alternate, exemplary embodiment of the present invention.

FIG. 11 illustrates a differential sensor system that employs two or detectors. The source 22 is configured to displace in response to a change in condition of the annular region 14. To determine the magnitude and direction of the source's 22 displacement, the exemplary system 10 employs a plurality of detectors 18. The detectors 18 are electrically arranged like the detector 18 of FIG. 10. However, in this embodiment, the processing device 152 has two inputs, one from each of the detectors 18. The processing device 152 is configured to compare the detected levels of radiation from the individual detectors to determine the position of the source and, in turn, to quantify the change in condition in the annular region.

With respect to the orientation of FIG. 11, if the source 22 is displaced downwardly, it moves closer to the lower detector 18 and further from the upper detector 18. This movement increases the levels of radiation detected by the lower detector 18 while decreasing the levels of radiation detected by the upper detector. Moreover, the greater the increase of radiation detected lower detector (and the greater the decrease of radiation detected by the upper detector), the greater the displacement of the source 22. Because displacement of the source is proportional to the change in condition, a comparison of the changes in detected radiation levels provides a quantifiable representation of the change in the condition. And if the source 22 were to move upwardly, the upper detector 18 would see an increase in radiation levels whilst the lower detector would see a decrease, the increase and decrease being proportional to the amount of displacement of the source. Advantageously, because the embodiment of FIG. 11 relies on a differential comparison of detected radiation levels, the system 10 is not a susceptible to background radiation or changes in such background radiation. For instance, if the production fluid produced by the downhole well bore were to have radioactive particle, these particles would increase the background radiation in the annular environment 14. However, this increase would, it is believed, affect equally the detectors, causing in equal rise in detected radiation levels. Thus, displacement of the source still produces a relative increase in one detector 18 and a relative decrease in the other detector, providing a mechanism for determining the direction and magnitude of the source's 22 displacement.

Figure 12:
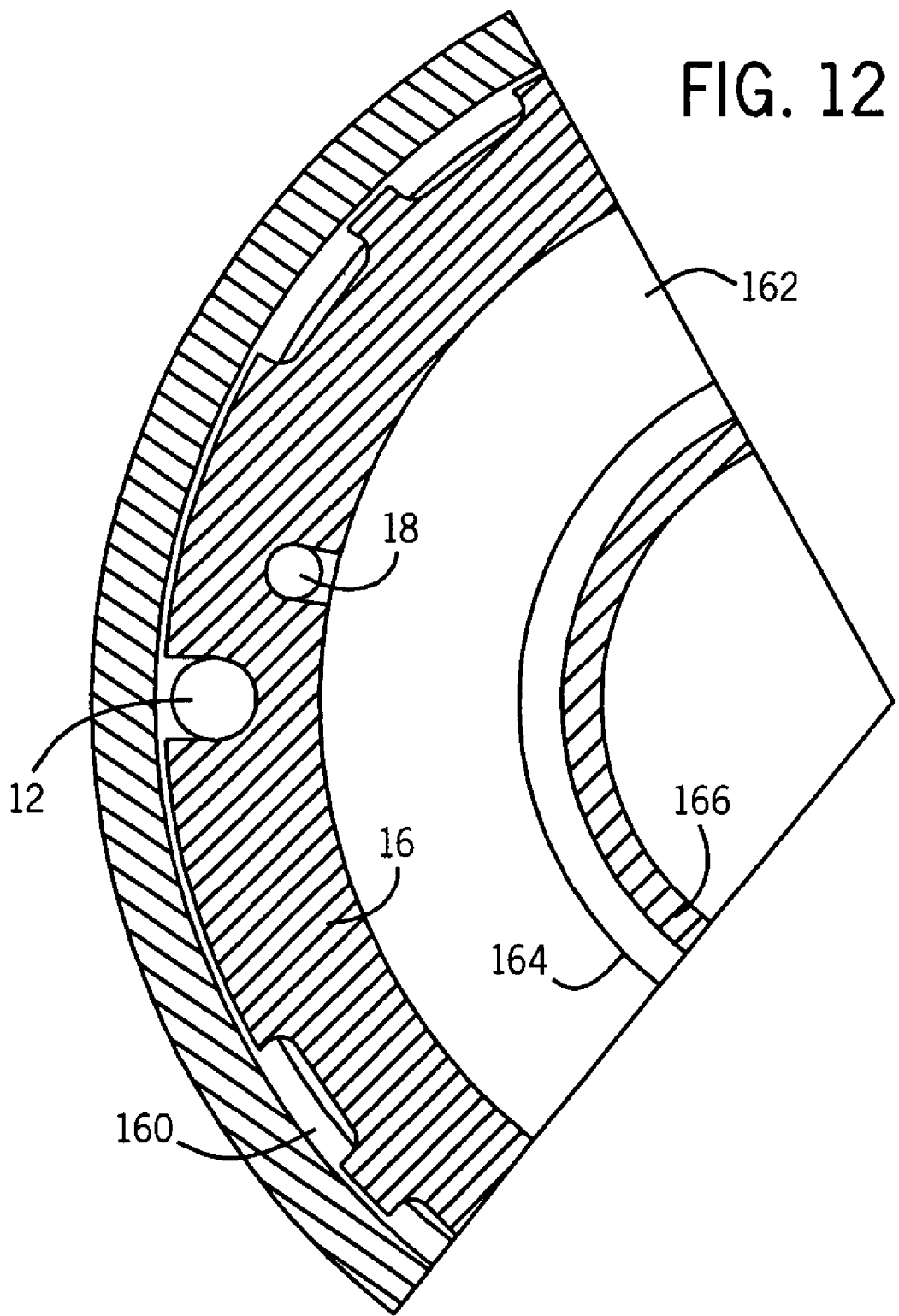
FIG. 12 is a cross-section of non-intrusive monitoring system disposed in an annular region between casing segments, in accordance with an exemplary embodiment of the present invention.

Turning to FIG. 12, this figure illustrates and exemplary system 10 disposed in a downhole casing string assembly. The detector 18 is disposed in the "A" annulus 162 of the string assembly, while the source device 12 is disposed in the "B" annulus 160. The source device 12 and the detector, obviously, are on opposite sides of the casing string 16. This string 16 may serve as a support structure for the source device 12 and/or the detector 18. To supply operating power to the detector 18, the exemplary system 10 includes an EMF (Electric Magnetic Field) power source. This EMF power source comprises a wound coil 164 that circumscribes the production tubular 166. This wound coil 164 acts as the primary coil of an air-core transformer. The system also includes a secondary coil (not shown) disposed in the power source 146 of the detector 18 (see FIGS. 10 and 11). Thus, by modulating current in the primary coil, an induced high-voltage current, sufficient to operate the detectors, can be provided through the secondary coil. Moreover, the primary coil can receive EMF feedback from the secondary coil, to communicate to the coil the detected levels of radiation, for instance.

Figure 13:
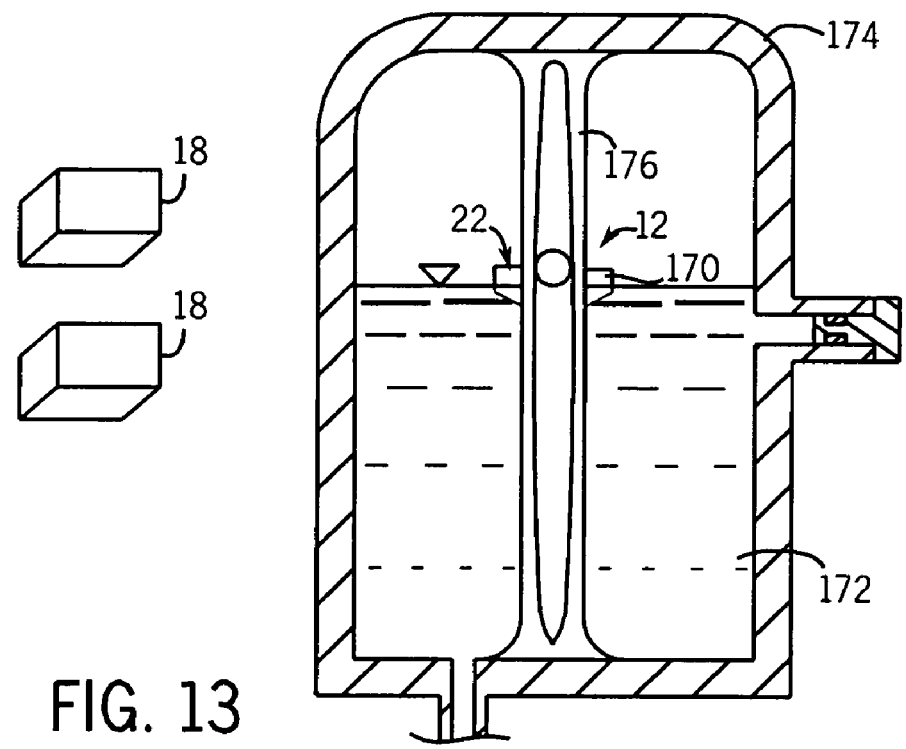
FIG. 13 is a cross-section and schematic view of a non-intrusive monitoring system disposed in a sealed fluid storage tank, in accordance with an exemplary embodiment of the present invention.

As further exemplary embodiments, the present invention can provide benefits for determining the liquid level within a sealed container. For example, the source device 12 of FIG. 13 includes a floatation assembly 170 that carries source 22, the positions of which are defined by the level of fluid 172 in the sealed container 174. In operation, as the level of fluid in the container 174 rises or falls, the flotation assembly 170, which is coupled in a sliding manner to channel 176, correspondingly displaces. As discussed above, this displacement is communicated to the plurality of detectors 18 (a single detector can be employed as well) disposed outside the container 172 in the form of changed radiation levels. Again, these changes in radiation levels provide a mechanism through which the displacement and corresponding change in fluid level can be quantified.

Figure 14:
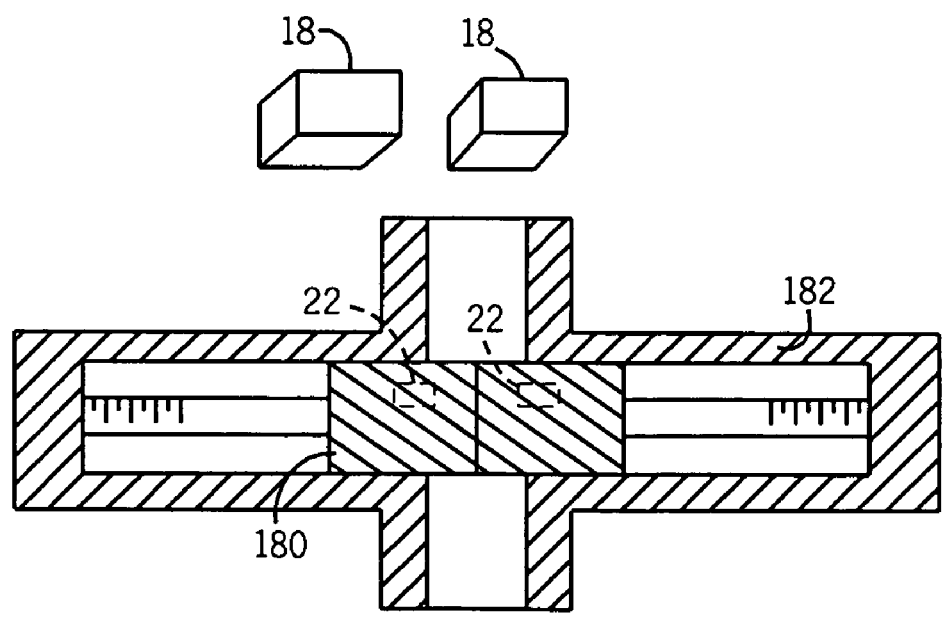
FIG. 14 is a cross-section and schematic view of a non-intrusive monitoring system disposed in a blow-out preventer (BOP), in accordance with an exemplary embodiment of the present invention.

FIG. 14 illustrates yet another exemplary embodiment of the present invention. In this embodiment, the radioactive source 22 elements are located on the rams 180 of a blow-out preventer 182 (BOP). As is appreciated by those of ordinary skill in the art, BOP's are employed to seal a downhole bore in the event of excess wellbore pressure, for instance. This sealing is effectuated by driving the rams 180 into engagement with one another. However, the sealing ability of the rams 180 can deteriorate. In fact, the level of deterioration and, thus, sealing ability is believe to correlate with the required ram stroke (i.e., displacement of the rams 180) to achieve wellbore closure. Thus, an accurate shear ram stroke measurement is believed to provide information regarding the remaining BOP life and the confidence in the BOP's future operations.

To measure this ram stroke, the source 22 is placed on or inside each of the rams 180. Through the use of one or more detectors 18, the change of position of the rams 180 can be determined. Knowledge of the displacement needed for metal-to-metal contact of the rams 180 is believed to indicate BOP integrity, with a greater ram stroke correlating with decreased BOP integrity. Thus, as packer material of the BOP is abraded, extruded, or otherwise degraded during well operation or by repeated BOP function testing, the remaining packer life, it is believed, can be estimated. This approach is superior to one in which testing only provides evidence that there was adequate packer life to effectuate a seal the last time the BOP was operated or tested. In other words, the above technique provides a forward-looking estimate of BOP integrity, rather than the present tests which only determine that integrity of the BOP was adequate at, and only at, the time of the test.

Figure 15:
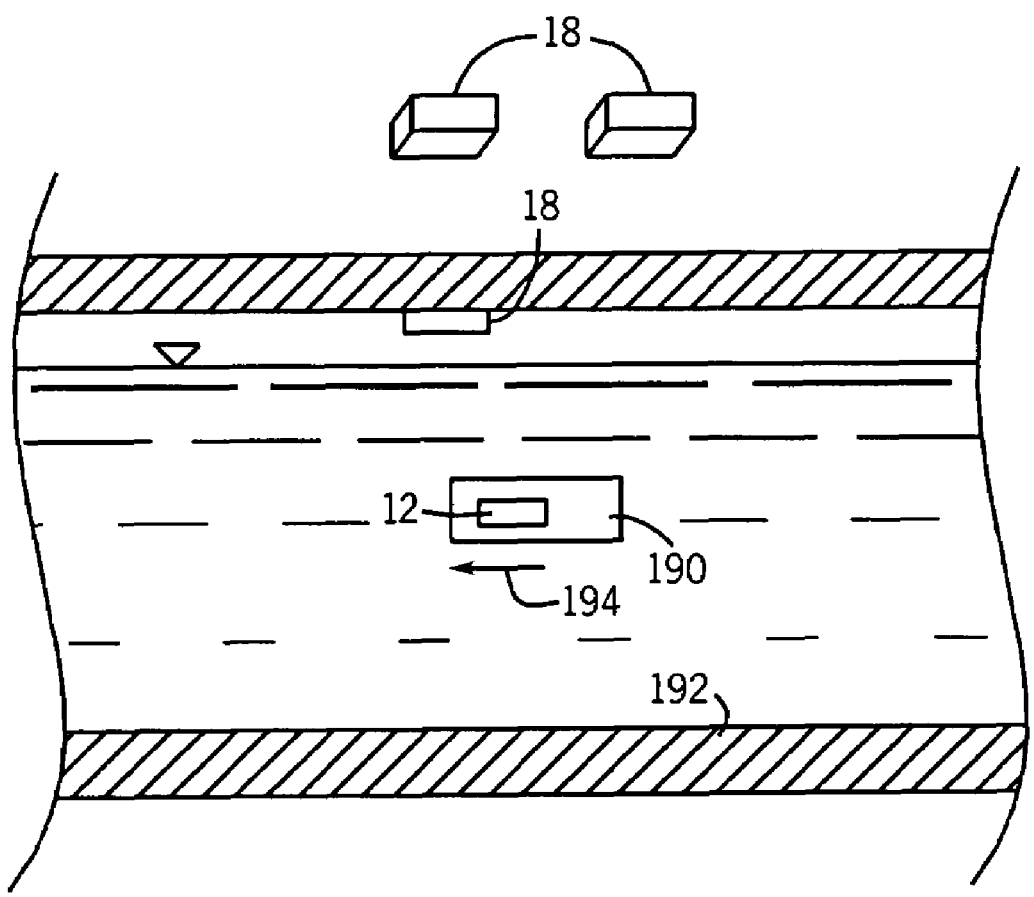
FIG. 15 is a schematic illustration of a pipeline and pipeline pig, in accordance with an exemplary embodiment of the present invention.

FIG. 15 illustrates data communication through a steel barrier utilizing modulated nuclear flux. For instance, in the process of pipeline inspection, a pipeline pig 190 could be equipped with a radiation 22 source held in a source 12, which are discussed above. By way of operating the controlled aperture 46 of the source device 12 of FIG. 1, radiation escapes the shielded container or, alternatively, be blocked from escaping. At one or more points along the length of the pipeline 192 and in the flow fluid flow (arrow 194), the pig 190 is briefly captured and held stationary in the proximity of a detector 18 that may be in the pipeline 192 or external to the pipeline 192. The pig 190 may then relay its status or other information pertinent to its specific purpose to the detector by operating the aperture on the source device 12 in a coded sequence manner. The aperture 46 (see FIG. 1) could be operated in an alternating (i.e., open/close pattern) to, in essence, transmit bits of information. An open aperture 46 might, for example, represent a logic one, while a closed aperture would represent a logic zero. Thus, an arbitrary length digital message could be conveyed through the wall of the pipeline 192 without need to penetrate the pipeline wall.

Again, the above description is illustrative of exemplary embodiments, and many modifications may be made by those skilled in the art without departing from the invention whose scope is to be determined from the literal and equivalent scope of the claims below.

The invention claimed is:

1. A sensor system for detecting a change in condition, comprising:
    a radioactive source;
    at least one radiation detector configured to detect radiation from the radioactive source;
    a displacement assembly configured to physically displace in response to the change in condition and configured to change the radiation levels detected by the radiation detector in response to such displacement;
    a shielding assembly;
    wherein the displacement assembly is configured to physically displace the shielding assembly in response to the change in condition; and
    wherein the shielding assembly comprises a radioactively absorbent shield disposed between the radioactive source and the radiation detector, the shield comprising a first portion that facilitates a greater transmission of radiation from the radioactive source at a given distance from the source than a second portion of the shield at the given distance.

2. The sensor system as recited in claim 1, comprising a processing device configured to produce the change in condition in response to an input signal.

3. The sensor system as recited in claim 1, wherein the displacement assembly is configured to displace in response to a change in temperature.

4. The sensor system as recited in claim 1, wherein the displacement assembly is configured to displace in response to a change in pressure.

5. A sensor system for detecting a change in condition, comprising:
    a radioactive source;
    a plurality of detectors configured to detect radiation emitted from the radioactive source;
    a displacement assembly configured to alter the position of the radioactive source in response to the change in condition; and wherein the displacement assembly comprises:
a Bourdon tube; and
a channel and a rolling element disposed in the channel, the position of the rolling element with respect to the channel defining the displacement of the source, and wherein the channel facilitates translation of rotational motion of the Bourdon tube into linear motion of the source.

6. The sensor system of claim 5, wherein the displacement assembly is configured to linearly displace the radioactive source with respect to the plurality of detectors in response to the change in condition.

7. The sensor system of claim 5, wherein the displacement assembly comprises an adjustable volume configured to change in size in response to the change in condition.

8. A sensor system for detecting a change in condition of an annular region, comprising:
first and second walls cooperative to define the annular region;
a radioactive source disposed in the annular region;
at least one radiation detector disposed outside the annular region and configured to detect radiation emitted by the radioactive source;
a displacement assembly configured to physically displace in response to the change in condition and configured to change the radiation levels detected by the at least one radiation detector in response to such displacement;
a shielding assembly; and
wherein the displacement assembly is configured to physically displace the shielding assembly in response to the change in condition.

9. The sensor system as recited in claim 8, wherein the first and second walls respectively comprise first and second casing strings.

10. The sensor system as recited in claim 8, wherein the shielding assembly comprises a first portion that facilitates a greater transmission of radiation from the radioactive source at a given distance from the source than a second portion of the shielding assembly at the given distance.

11. The sensor system as recited in claim 10, wherein the shielding assembly is disposed in the annular region.

12. The sensor system as recited in claim 8, including a processing device coupled to the at least one radiation detector.

13. The sensor system as recited in claim 12, wherein the processing device includes a memory component comprising data correlating changes in radiation levels detected by the detector due to displacement of the displacement assembly with an increase in pressure of the annular region.

14. The sensor system as recited in claim 12, wherein the processing device includes a memory component comprising data correlating displacement of the displacement assembly to an increase in temperature of the annular region.

15. A method of detecting a change in condition, comprising:
disposing a radioactive source on one side of a physical barrier;
disposing at least one radiation detector configured to detect radiation from the source on an opposite side of the physical barrier;
changing the radiation levels detected by the at least one radiation detector in response to the change in condition by physically displacing a shielding assembly in response to the change in condition; and
quantifying the change in condition based on the radiation levels detected by the at least one detector.

16. The method as recited in claim 15, comprising quantifying the change in condition via a look-up table or a predetermined formula or any combination thereof.

17. A method of detecting a change in condition, comprising:
disposing a radioactive source on one side of a physical barrier;
disposing at least one radiation detector configured to detect radiation from the source on an opposite side of the physical barrier;
changing the radiation levels detected by the at least one radiation detector in response to the change in condition by physically displacing a shielding assembly in response to the change in condition; and
wherein the shielding assembly comprises a shield disposed between the radioactive source and the radiation detector, the shield comprising a first portion that facilitates a greater transmission of radiation from the radioactive source at a given distance from the source than a second portion of the shield at the given distance.

18. The sensor system as recited in claim 5, comprising a processing device configured to produce the change in condition in response to an input signal.

19. The sensor system as recited in claim 5, wherein the displacement assembly is configured to displace in response to a change in temperature.

20. The sensor system as recited in claim 5, wherein the displacement assembly is configured to displace in response to a change in pressure.

21. A sensor system for detecting a change in condition of an annular region, comprising:
first and second casing strings cooperative to define the annular region;
a radioactive source disposed in the annular region;
a radiation detector disposed outside the annular region and configured to detect radiation emitted by the radioactive source;
a shielding assembly configured to shield radiation emitted by the radioactive source;
a displacement assembly configured to physically displace the shielding assembly in response to the change in condition to change the radiation levels detected by the radiation detector; and
a processing device capable of receiving an input signal from the radiation detector and to produce the change in condition based on the input signal.

* * * * *